US008040501B2

(12) United States Patent
Murayama

(10) Patent No.: US 8,040,501 B2
(45) Date of Patent: Oct. 18, 2011

(54) IMAGE FORMING APPARATUS

(75) Inventor: Kentaro Murayama, Kasugai (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 127 days.

(21) Appl. No.: 12/564,081

(22) Filed: Sep. 22, 2009

(65) Prior Publication Data

US 2010/0080577 A1 Apr. 1, 2010

(30) Foreign Application Priority Data

Sep. 29, 2008 (JP) ................................ 2008-251831

(51) Int. Cl.
*G01J 1/00* (2006.01)

(52) U.S. Cl. ...................................................... 356/213

(58) Field of Classification Search ........................ None
See application file for complete search history.

(56) References Cited

U.S. PATENT DOCUMENTS

| | | | | |
|---|---|---|---|---|
| 5,499,079 | A * | 3/1996 | Kinoshita et al. | 399/46 |
| 5,512,986 | A | 4/1996 | Toyomura et al. | |
| 6,510,297 | B2 * | 1/2003 | Kawai et al. | 399/74 |
| 6,633,734 | B2 | 10/2003 | Maebashi et al. | |
| 2008/0124114 | A1 | 5/2008 | Yamagata et al. | |

FOREIGN PATENT DOCUMENTS

| | | |
|---|---|---|
| JP | 6-175452 A | 6/1994 |
| JP | 11-102111 A | 4/1999 |
| JP | 2001-092195 | 4/2001 |
| JP | 2002-236402 | 8/2002 |
| JP | 2003-057908 | 2/2003 |
| JP | 2003-098795 | 4/2003 |
| JP | 2006-276739 | 10/2006 |
| JP | 2006-284663 | 10/2006 |
| JP | 2007-121414 | 5/2007 |
| JP | 2008-009021 | 1/2008 |
| JP | 2008-134333 | 6/2008 |

OTHER PUBLICATIONS

JP Office Action dtd Sep. 14, 2010, JP Appln. 2008-251831, English translation.

* cited by examiner

*Primary Examiner* — Tu Nguyen
(74) *Attorney, Agent, or Firm* — Banner & Witcoff, Ltd

(57) ABSTRACT

An image forming apparatus includes a carrier, a forming device forming a mark on the carrier, a sensor, a determiner, a changer, an evaluator and a controller. The sensor includes a light emitting device that emits light toward the carrier and the light receiving device that receives light reflected from the carrier or the mark and outputs a light reception signal corresponding to the received light quantity. The determiner determines a position of the mark based on the light reception signal. The changer changes sensor sensitivity by changing a quantity of light from the light emitting device or sensitivity of the light receiving device. The evaluator obtains the light reception signals multiple times and evaluates a degree of closeness between an average level of the light reception signals and a target level. The controller controls the changer to change the sensor sensitivity of the sensor according to an evaluation result.

14 Claims, 10 Drawing Sheets

IMAGE FORMING APPARATUS

CROSS REFERENCE TO RELATED APPLICATION

This application claims priority from Japanese Patent Application No. 2008-251831 filed on Sep. 29, 2008. The entire content of this priority application is incorporated herein by reference.

TECHNICAL FIELD

The present invention relates to an image forming apparatus.

BACKGROUND

A known image forming apparatus has a function to correct deviation etc. in an image forming position on, for example, a sheet. More specifically, the image forming apparatus forms a plurality of marks (that configure a pattern such as a registration pattern) on a belt and, while emitting light toward the belt, receives the reflection light using an optical sensor. Then, on a basis of a light reception signal outputted from the optical sensor, the image forming apparatus reads a difference between a reflectance (a quantity of reflected light) of a belt surface and a reflectance of a mark surface to determine the mark position on the belt. On a basis of a result of the determination, the apparatus corrects the deviation in the image forming position.

Note here that, the belt surface can get scratches and waste, and the scratches and waste can diffuse the reflection light. This causes decrease in the reflectance of the belt surface and can result in failure in determination of the mark position. Note that there is a known art addressed to reduce this failure. With the art, the apparatus evaluates a condition of the reflection of the belt surface and, according to a result of the evaluation, adjusts the sensitivity of the optical sensor.

Note that the degree of the scratches and waste varies by position on the belt surface and, accordingly, the reflectance of the belt surface varies by position; following this, the light reception signal also varies. However, the known art is configured to evaluate the condition of the reflection of the belt surface on the basis of the light reception signal at a single time point, i.e. without considering the reflectance variation. Therefore, even with the adjusted sensitivity of the optical sensor, accuracy in determining the mark position varies depending on the level of the light reception signal of the single time.

Note that the variation in the light reception signal can be caused not only by the variation in reflectance of the belt surface; the variation in the light reception signal can be caused also by other factors such as variation in quantity of light emitted from the optical sensor, in the photoelectric conversion efficiency of the optical sensor, etc.

SUMMARY

An aspect in accordance with the present invention is an image forming apparatus including: a carrier; a forming device configured to form a mark on the carrier; a sensor including a light emitting device and a light receiving device, the light emitting device being configured to emit light toward the carrier, and the light receiving device being configured to receive light reflected from at least one of the carrier and the mark and output a light reception signal corresponding to a quantity of the received light; a determiner configured to determine a position of the mark on a basis of the light reception signal; a changer configured to change a sensor sensitivity of the sensor by changing at least one of a quantity of light emitted by the light emitting device and a sensitivity of the light receiving device; an evaluator configured to obtain the light reception signal a plurality of times and configured to evaluate a degree of closeness between an average level of the light reception signal obtained a plurality of times and a target level; and a controller configured to control the changer to change the sensor sensitivity of the sensor according to a result of the evaluation of the evaluator.

DETAILED DESCRIPTION

<Illustrative Aspect>

An illustrative aspect in accordance with the present invention will be described with reference to drawings.

(Schematic Configuration of Printer)

Figure 1:
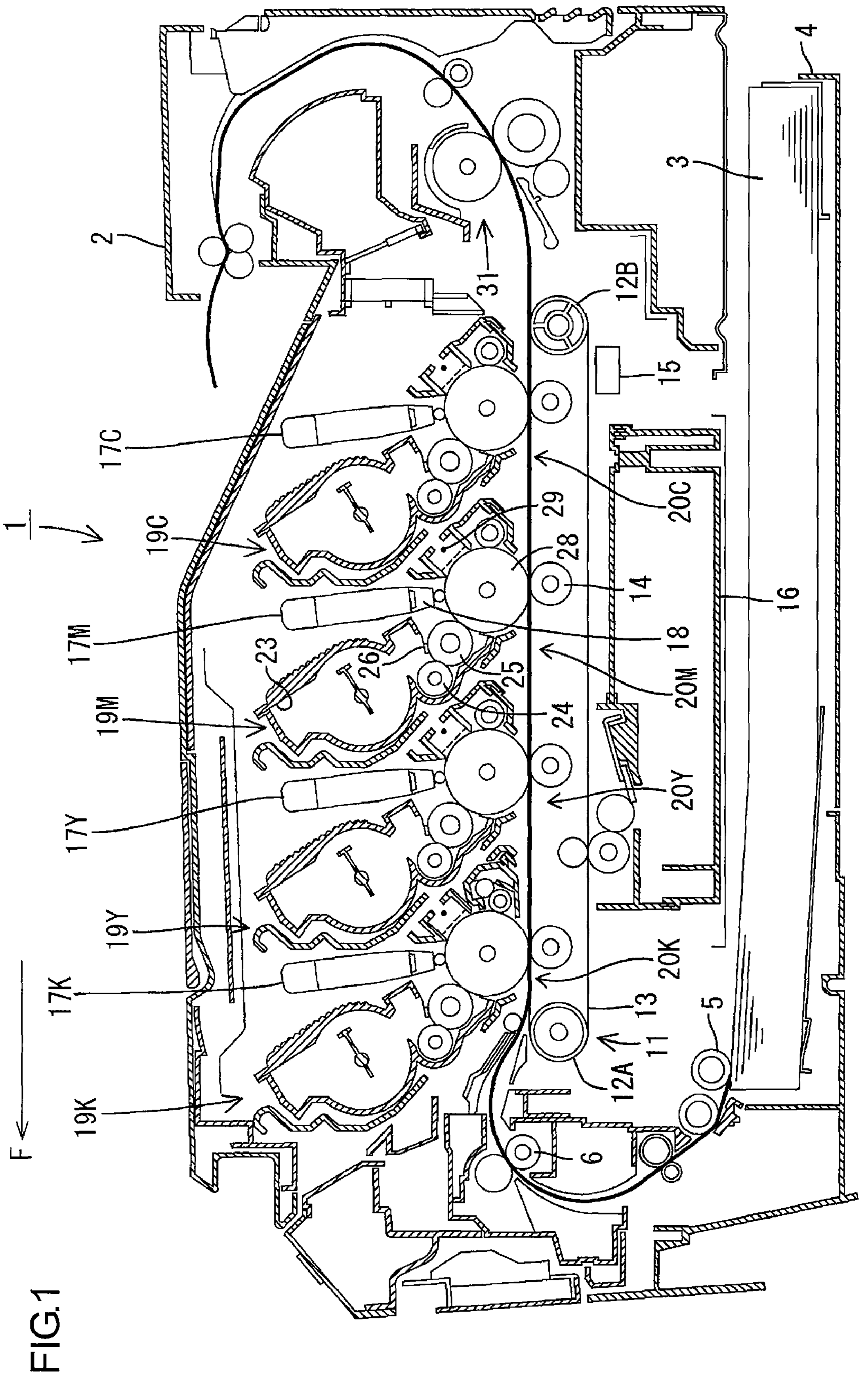
FIG. 1 is a side sectional view illustrating a schematic configuration of a printer of an illustrative aspect in accordance with the present invention.

As illustrated in FIG. 1, a printer 1 (an illustration of an image forming apparatus) of this illustrative aspect is a color printer of a direct transfer type. The printer 1 can form a color image using toner in, for example, four colors (black K, yellow Y, magenta M, and cyan C). The leftward direction in FIG. 1 represents the frontward direction (the vertical scanning direction; illustrated by reference character F in each figure) of the printer 1, while the depthwise direction represents the lateral direction (the main scanning direction) of the printer 1. Components and terms of the printer 1 for respective colors will be designated with reference characters having K, C, M, and Y (representing the black, cyan, magenta, and yellow colors, respectively) on the end.

The printer 1 includes a casing 2. A sheet supply tray 4 is provided in a bottom portion of the casing 2 such that a plurality of sheets 3 (herein sheet is broadly defined as paper, plastic, etc.) can be stacked therein. A sheet supply roller 5 is provided above the front end of the sheet supply tray 4. As the sheet supply roller 5 rotates, a sheet 3 stacked uppermost in the sheet supply tray 4 is sent out toward a registration roller 6. The registration roller 6 corrects skew of the sheet 3 and then conveys the sheet 3 onto a belt unit 11.

The belt unit 11 includes front and rear support rollers 12A, 12B, respectively, and a loop belt 13 (and illustration of an "object" and a "carrier") stretched between the support rollers 12A, 12B. The belt 13 is made of resin such as polycarbonate and has a mirror finished surface. As the rear support roller 12B rotates, the belt 13 circulates and backwardly conveys the sheet 3 carried thereon. Four transfer rollers 14 are provided at respective positions in the loop of the belt 13 so as to be opposed to photosensitive bodies 28 of four process units 19K-19C across the belt 13.

Furthermore, a pattern sensor 15 is disposed below the belt 13. The pattern sensor 15 can determine a position of a mark (or presence/absence of the mark) carried on a surface of the belt 13. In addition, a cleaner 16 is provided below the belt unit 11. The cleaner 16 can collect toner, paper powder, etc. that are attached to the surface of the belt 13.

Four exposure units 17K, 17Y, 17M, 17C and the process units 19K, 19Y, 19M, 19C are arranged in tandem above the belt unit 11. The exposure units 17K, 17Y, 17M, 17C, the respective process units 19K, 19Y, 19M, 19C, and the respective transfer rollers 14 configure respective sets of image forming units 20 (illustrations of "forming units"). The printer 1 as a whole thus includes four image forming units 20K, 20Y, 20M, 20C each corresponding to respective colors (black, yellow, magenta, and cyan, respectively).

The exposure units 17K-17C include respective LED heads 18. Each of the LED heads 18 has a plurality of LEDs arranged in line. Light emission from the exposure units 17K-17C is controlled on a basis of a forming image data so that the LED heads 18 emit light toward the surfaces of the respective opposing photosensitive bodies 28 by line. Exposure is thus performed.

Each of the process units 19K-19C includes a toner chamber 23 and a supply roller 24, a developer roller 25, and a layer-thickness regulating blade 26 disposed below the toner chamber 23, etc. The toner chambers 23 store toner (developer) in the respective colors. The toner released from the toner chambers 23 is supplied to the respective developer rollers 25 by rotation of the respective supply rollers 24. Then, the toner is positively charged by friction between the supply rollers 24 and the developer rollers 25. Thereafter, along with rotation of the developer rollers 25, the toner enters the gaps between the respective layer-thickness regulating blades 26 and the developer rollers 25. The toner is still more sufficiently charged by friction there and is carried on the developer rollers 25 as even and thin layers.

The process units 19K-19C further includes the respective photosensitive bodies 28 and respective scorotron chargers 29. The surfaces of the photosensitive bodies 28 are covered with photosensitive layers having positive charge polarity. At a time of image formation, the surfaces of the rotating photosensitive bodies 28 are uniformly and positively charged by the chargers 29 and, then, are exposed by the exposure units 17K-17C. Thus, electrostatic latent images are formed on the surfaces of the photosensitive bodies 28.

Next, the developer rollers 25 supply toner to the respective electrostatic latent images. The electrostatic latent images are thus visualized and become toner images. Thereafter, while the sheet 3 passes each of transfer positions between the photosensitive bodies 28 and the transfer rollers 14, the toner images are transferred onto the sheet 3 under the negative transfer voltage applied to the transfer rollers 14. The sheet 3 with the transferred toner images is then conveyed to a fixing unit 31. The toner images are fixed there. Thereafter, the sheet 3 is upwardly conveyed and is ejected onto the top of the casing 2.

(Electrical Configuration of Printer)

Figure 2:
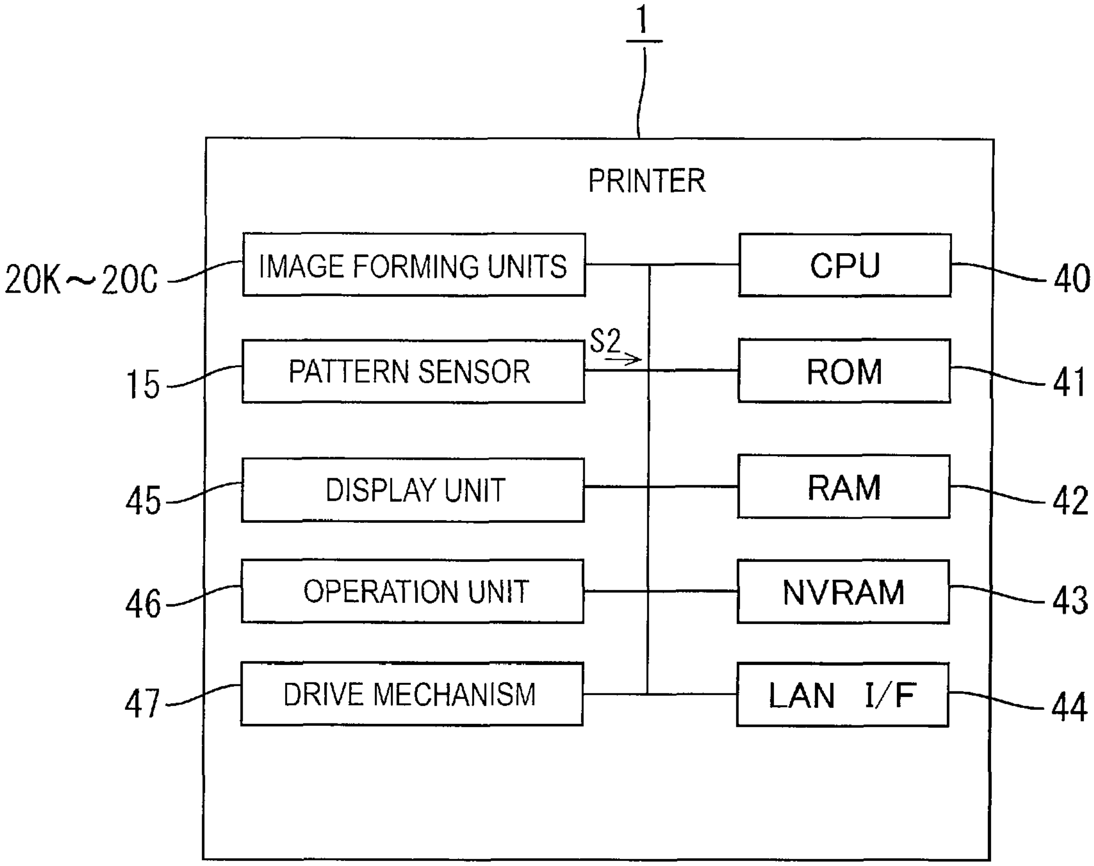
FIG. 2 is a block diagram schematically illustrating an electrical configuration of the printer.

As illustrated in FIG. 2, the printer 1 includes a CPU 40, a ROM 41, a RAM 42, an NVRAM (non-volatile random access memory) 43, and a network interface 44. These members are connected to the image forming units 20K-20C, the pattern sensor 15, a display unit 45, an operation unit 46, a drive mechanism 47, etc.

Programs for the printer 1 to execute various kinds of processes such as a sensor-sensitivity adjustment process (described below) are stored in the ROM 41. The CPU 40 reads out the programs from the ROM 41 and, according to the programs, controls each component while storing the result of the processes in the RAM 42 or in the NVRAM 43. The network interface 44 is connected to an external computer (not illustrated) via a communication line such that mutual data communication is available.

The display unit 45 includes a liquid crystal display, a lamp, etc. to display various kinds of setting windows, operating states of the printer 1, etc. The operation unit 46 includes a plurality of buttons that the user can operate to input various kinds of information. The drive mechanism 47 includes a drive motor etc. and rotates the belt 13 etc.

(Pattern Sensor)

Figure 3:
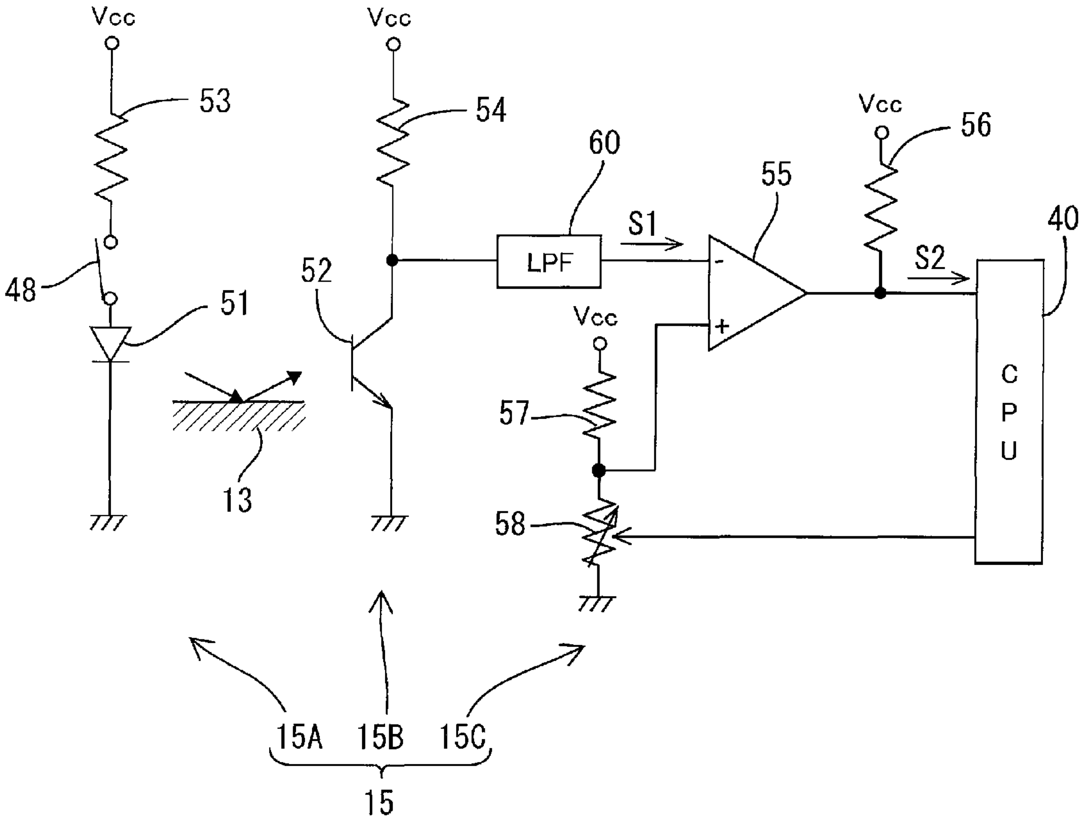
FIG. 3 is an illustration of a circuit configuration of a pattern sensor.

As illustrated in FIG. 3, the pattern sensor 15 includes a light emitting circuit 15A (an illustration of a "light emitting device"), a light receiving circuit 15B (an illustration of a "light receiving device"), and a comparison circuit 15C. The light emitting circuit 15A emits light toward the belt 13, while the light receiving circuit 15B receives reflection of the light from the belt 13 and outputs a light reception signal S1. The comparison circuit 15C compares a level of the light reception signal S1 with a reference level.

More specifically, the light emitting circuit 15A includes a light emitting element 51 having a plurality of LEDs. The cathode of the light emitting element 51 is grounded, while the anode is connected to a power line Vcc via a switch element 48 and via a resistor 53. In the sensor-sensitivity adjustment process and in a correction process (both described below), the CPU 40 adjusts the quantity of light emitted from the light emitting circuit 15A by PWM control. In this illustrative aspect, the CPU 40 provides a PWM signal (a control signal) to the switch element 48 to turn on and off the switch element 48, while increasing the PWM value (the duty ratio; an illustration of a control value) of the PWM signal to increase the quantity of light emitted from the light emitting circuit 15A. By changing the quantity of light emitted from the light emitting circuit 15A, the level of the light reception signal S1 (sensor sensitivity) can be adjusted. The switch element 48 functions as a "changer" then.

The light receiving circuit 15B includes a light receiving element 52 having a phototransistor. The emitter of the light receiving element 52 is grounded, while the collector is connected to the power line Vcc via a resistor 54. The collector of the light receiving element 52 is connected also to the comparison circuit 15C via a low-pass filter 60. Thus, the light receiving element 52 receives the light reflected from the belt 13 and provides the light reception signal S1 from the collector thereof to the comparison circuit 15C via the low-pass filter 60. Note that the level (the voltage value) of the light reception signal S1 corresponds to the quantity of light received from the belt 13. In this illustrative aspect, the light receiving element 52 outputs the light reception signal S1 at a lower level when the quantity of the received light is larger. In addition, the low-pass filter 60 is, for example, a CR or LC low-pass filter. The low-pass filter 60 reduces a noise content (for example, a spike noise) contained in the light reception signal S1.

The comparison circuit 15C includes an OP-amp (operational amplifier) 55 and resistors 56, 57, 58. The inverting input of the OP-amp 55 is connected to the output of the low-pass filter 60. The output of the OP-amp 55 is connected to the power line Vcc via a pull-up resistor 56 and to the CPU 40. The resistors 57, 58 configure a voltage divider circuit that provides a divided voltage as the reference level to the non-inverting input of the OP-amp 55. Thus, the OP-amp 55 compares the level of the light reception signal S1 inputted to the inverting input with the reference level. Then, the OP-amp 55 outputs a binary signal S2 that corresponds to the comparison result. Note that the binary signal S2 is at the high level when the level of the light reception signal S1 is equal to or lower than the reference level.

The CPU 40 can set the reference level by changing, for example, a resistance value of the resistor 58. Thus, in the color-deviation correction process (described below), the CPU 40 sets the reference level at a mark-determination threshold VH (e.g. 1.5 [V]); likewise, in the sensor-sensitivity adjustment process (described below), the CPU 40 sets the reference level at a starting level V1 (e.g. 4.5 [V]), a first level V2 (e.g. 3 [V]; an illustration of a "predetermined level"), and a second level V3 (e.g. 1 [V]; an illustration of a "target level").

(Color-Deviation Correction process and Determination Pattern)

The image forming positions in each color on the sheet 3 can be deviated in the vertical scanning direction (the deviation is hereinafter referred to simply as a "positional deviation"). In order to correct the positional deviations, the printer 1 performs a "color-deviation correction process". Note that, in this illustrative aspect, the black color is treated as a reference color, while the yellow, magenta, and cyan colors are treated as adjusted colors. The CPU 40 adjusts the adjusted-color image forming positions relative to the reference-color image forming position.

Figure 4:
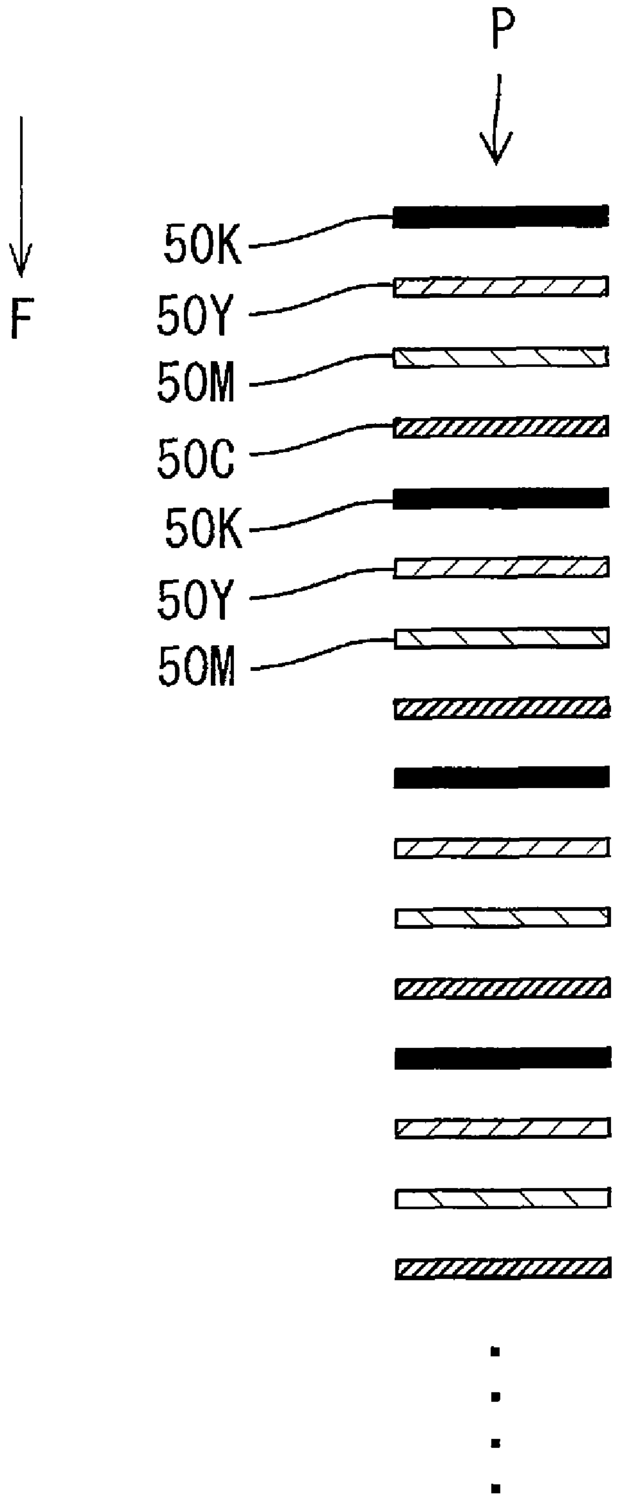
FIG. 4 is an illustration of a determination pattern.

In the color-deviation correction process, a determination pattern P illustrated in FIG. 4 is used. The determination pattern P has a plurality of mark sets of marks 50. Each mark set is configured by four (black, yellow, magenta, and cyan, arranged in that order) marks 50K-50C. Each of the marks 50K-50C is elongated in the main scanning direction and is narrow. The marks 50 are arranged at intervals in the vertical scanning direction on the belt 13.

Where the adjusted-color image forming positions are deviated, relative distances between the positions of the adjusted-color marks 50Y-50C and the positions of the reference-color mark 50K in a same mark set are different from respective predetermined ideal distances. Note that the predetermined ideal distances are relative distances between the adjusted-color mark forming positions and the reference-color mark forming position in the same mark set when the adjusted-color image forming positions are not deviated. The CPU 40 utilizes these differences. Namely, the CPU 40 calculates the relative distances between the positions of the adjusted-color marks 50Y-50C and the position of the reference-color mark 50K in every mark set. Then, on a basis of the calculation result with respect to every mark set, the CPU 40 calculates an average of the relative distances with respect to each adjusted color. Then, the CPU 40 sets the difference between the average and the predetermined ideal distance as the positional deviation amount with respect to each of the adjusted-colors. Then, the CPU 40 stores the positional deviation amounts in, for example, the NVRAM 43. In a usual image forming process, which is based on an image forming instruction from the external computer etc., the CPU 40 adjusts timings for the exposure units 17Y-17C (that correspond to the respective adjusted colors) to expose the respective photosensitive bodies 28 so as to compensate the positional deviation amounts.

(Relationship Between Light Reception Signal and Target Level)

Figure 5:
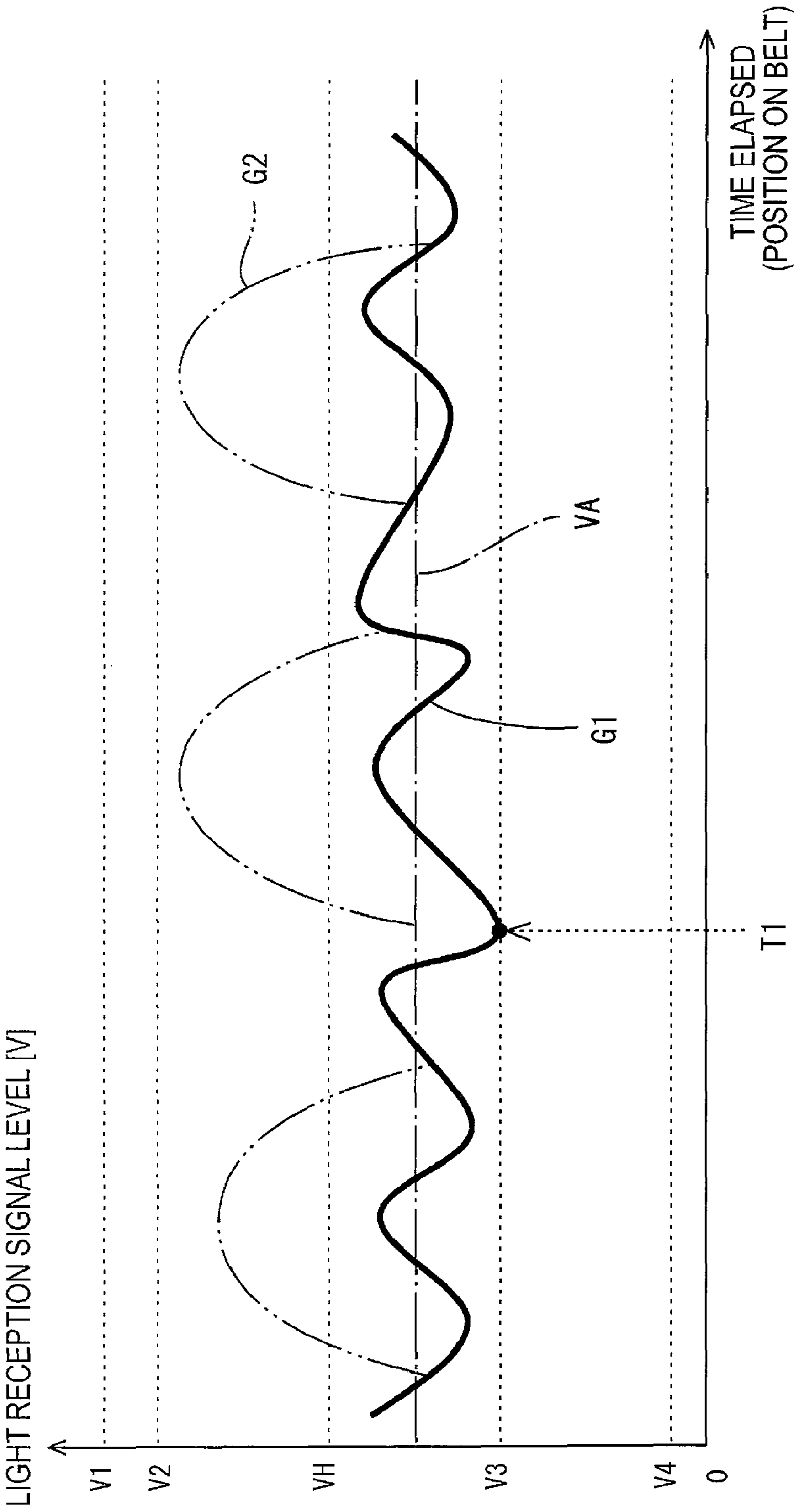
FIG. 5 is a first graph illustrating a relationship between a light reception signal, a target level, and a mark determination threshold.
Figure 6:
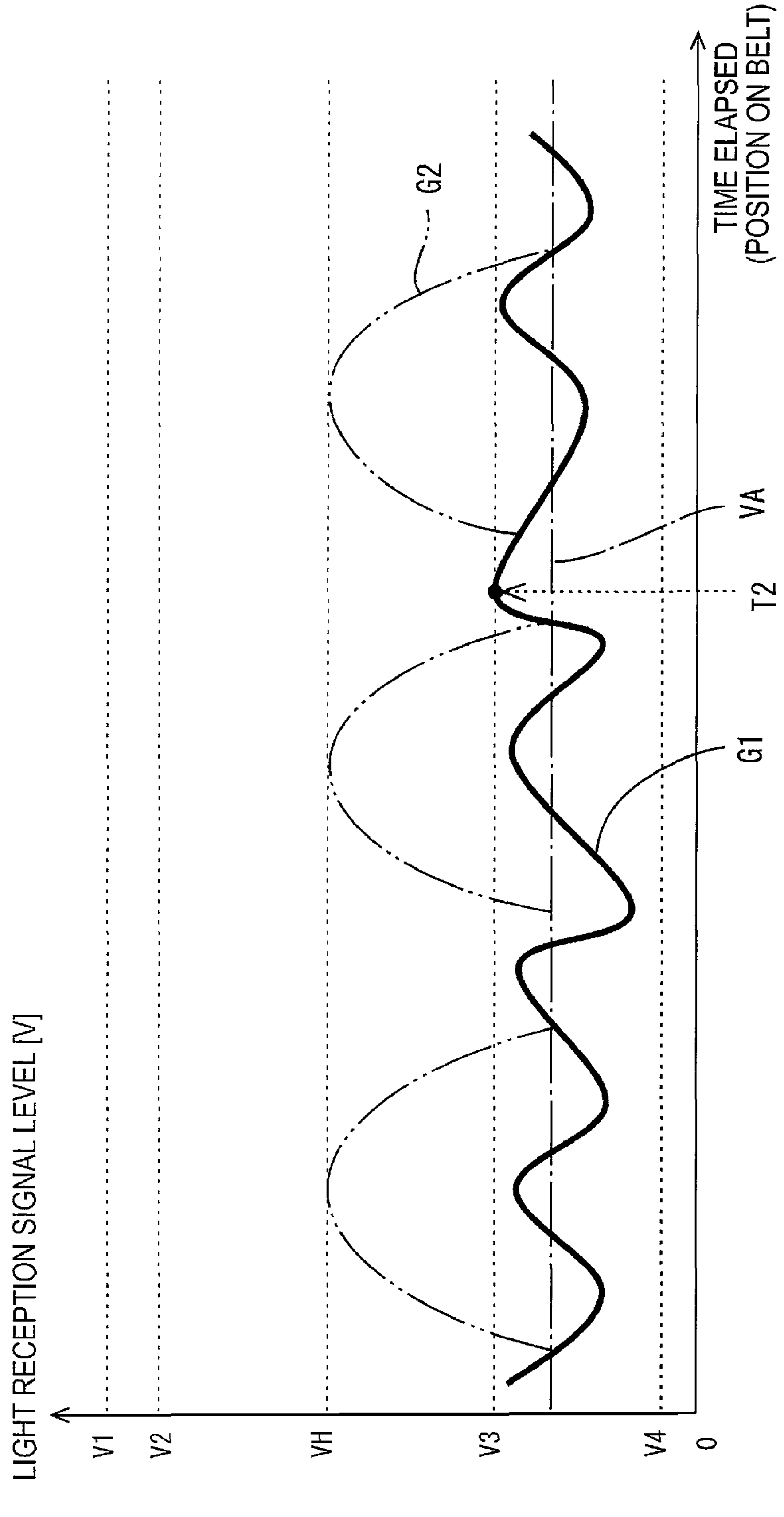
FIG. 6 is a second graph illustrating a relationship between the light reception signal, the target level, and the mark determination threshold.

Now referring to FIG. 5 and FIG. 6, the solid line G1 represents-the light reception signal S1 at a time when light is being emitted from the light emitting circuit 15A toward the belt 13 having no determination pattern P formed thereon; and the dashed-two-dotted line G2 represents outline of the light reception signal S1 at a time when light is being emitted from the light emitting circuit 15A toward the belt 13 having the determination pattern P formed thereon.

In each of these figures, the vertical axis represents the level (voltage value) of the light reception signal S1, wherein the level of the light reception signal S1 is higher upward (i.e. the quantity of light received by the light receiving circuit 15B is less upward). The horizontal axis represents the time elapsed or the circumferential position on the belt 13. Note that the reflectance of the surface of the belt 13 is higher than the reflectance of the marks 50. The light reception signal S1 at a time when light is being emitted from the light emitting circuit 15A toward the surface of the belt 13 having no marks 50 thereon is hereinafter referred to as a "belt-reflection light reception signal S1", while the light reception signal S1 at a time when light is being emitted from the light emitting circuit 15A toward the surface of the marks 50 is hereinafter referred to as a "mark-reflection light reception signal S1".

In the color-deviation correction process, the positions of the marks 50 is determined on a basis of the difference between the level of the mark-reflection light reception signal S1 and the level of the belt-reflection light reception signal S1. Accordingly, in order to stabilize the determination accuracy, the belt-reflection light reception signal S1 should be maintained at a constant level.

However, in practice, the belt-reflection light reception signal S1 fluctuates as illustrated by solid lines G1 in FIG. 5 and in FIG. 6. It is conceivable that the main factor of the fluctuation is variation in the reflectance of the surface of the belt 13: it is difficult to uniform the reflectance of the surface of the belt 13 over the entire length thereof, because production tolerance of the belt 13 and variation in distribution of waste, dust, residual toner, etc. on the belt 13 can vary the reflectance. It is also conceivable that other factors are variation in the quantity of light emitted from the light emitting circuit 15A (irregularity in correlation between the PWM value and the quantity of the emitted light) and variation in the sensitivity (the photoelectric conversion efficiency and the amplification degree) of the light receiving circuit 15B. These variations can be caused on a basis of variation in the circuit characteristics of the printer 1, change in the ambient environment such as the temperature, etc.

Suppose here a case that, as in a conventional configuration, the CPU 40, on the grounds that the light reception signal S1 is determined to have exceeded the second level V3 only once, sets the PWM value of the single time point as the PWM value for controlling the reception signal S1 at the second level V3. In this case, if the single time point comes at a time point T1 where the level of the belt-reflection light reception signal S1 is minimum as illustrated in FIG. 5, the PWM value at the time point T1 is determined as the PWM value for the second level V3. As a result of this, the entire line G1 becomes higher than the second level V3. Accordingly, the average level VA (for example, a central level of a max pulse amplitude of the line G1 or a mean level) of the belt-reflection light reception signal S1 exceeds the second level V3. Then, the difference between the average level VA and the mark-determination threshold VH becomes smaller by that degree (i.e. the degree of closeness therebetween becomes higher; or the sensor sensitivity becomes higher). Consequently, in the color-deviation correction process, the belt-reflection light reception signal S1 with a slight variation due to a noise etc. becomes higher than the mark-determination threshold VH. Thus, possibility of wrong determination as if the mark 50 exists on the belt 13 (though no mark 50 exists thereon) becomes higher.

On the other hand, if the single time point comes at the time point T2 where the level of the belt-reflection light reception signal S1 is maximum as illustrated in FIG. 6, the PWM value at the time point T2 is determined as the PWM value for the second level V3. As a result of this, the entire line G1—becomes lower than the second level V3. Accordingly, the average level VA of the belt-reflection light reception signal S1 becomes lower than the second level V3. Then, the difference between the average level VA and the mark-determination threshold VH is larger (i.e. the degree of closeness therebetween becomes lower; or the sensor sensitivity becomes lower). Consequently, in the color-deviation correction process, the mark-reflection light reception signal S1 with a slight variation due to a noise etc. does not exceed the mark-determination threshold VH. Thus, the possibility of wrong determination as if no mark 50 exists on the belt 13 (though the mark 50 exists thereon) becomes higher.

Thus, the adjustment of the sensor sensitivity based on the light reception signal S1 of the single time point causes larger variation in accuracy in determining the positions of the marks 50 depending on the level of the light reception signal of the single time point. In order to reduce the variation, it is necessary to reduce as much as possible the difference between the average level VA and the second level V3. Therefore, in this illustrative aspect, the CPU 40 executes the sensor-sensitivity adjustment process, which will be described below.

(Sensor-Sensitivity Adjustment Process)

Figure 7:
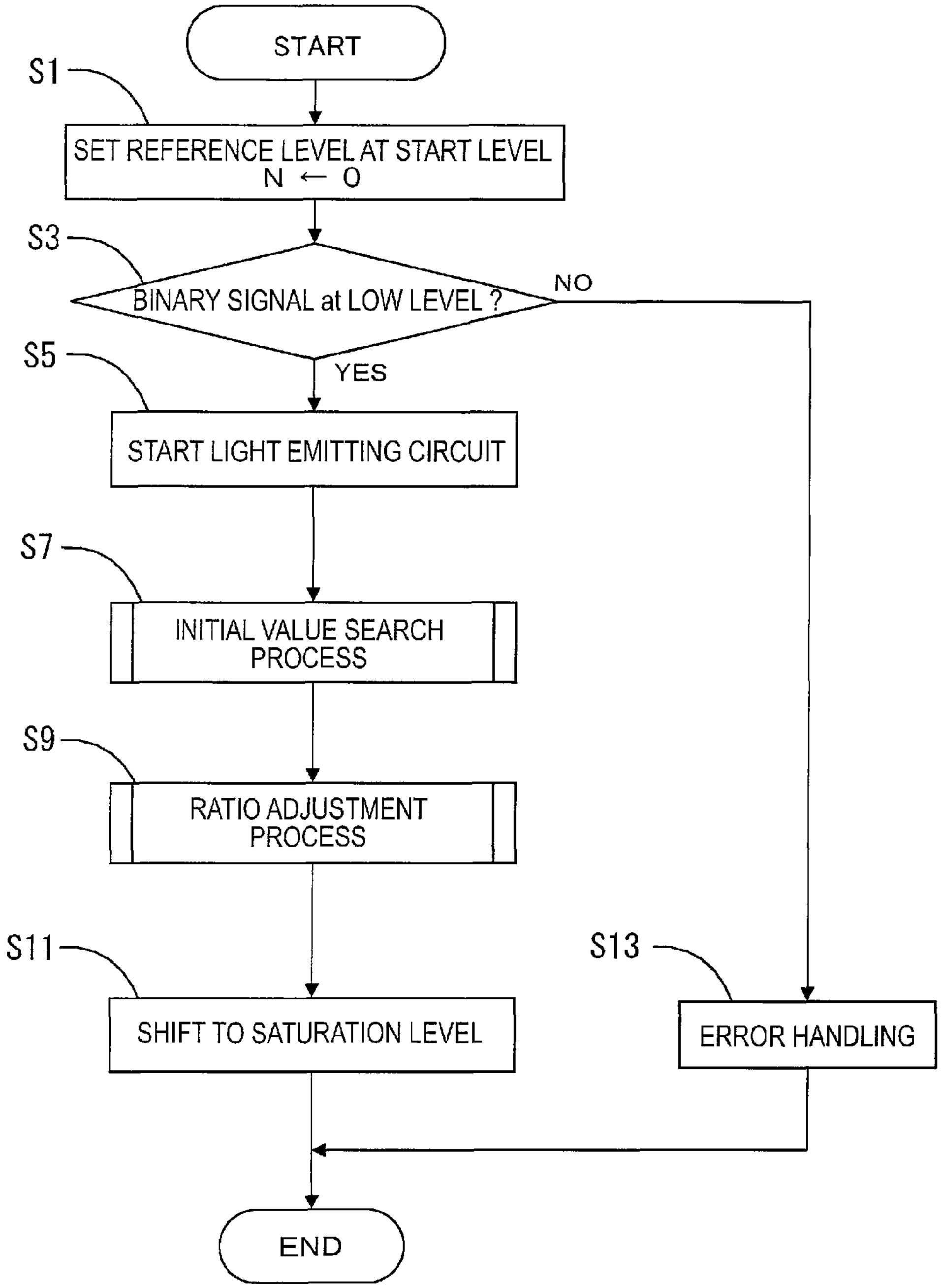
FIG. 7 is a flowchart illustrating a sensor-sensitivity adjustment process.
Figure 8:
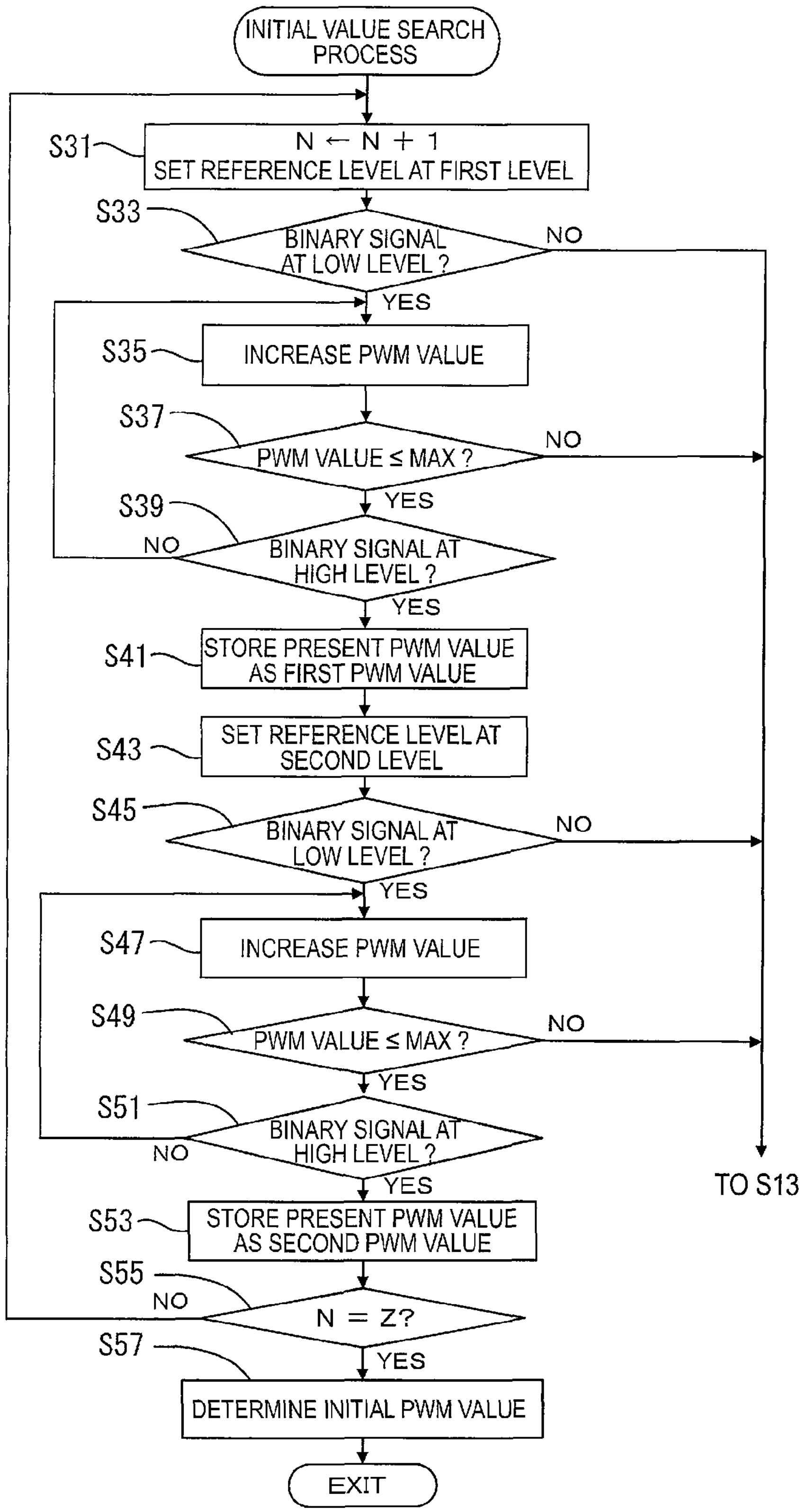
FIG. 8 is a flowchart illustrating an initial-value search process.
Figure 9:
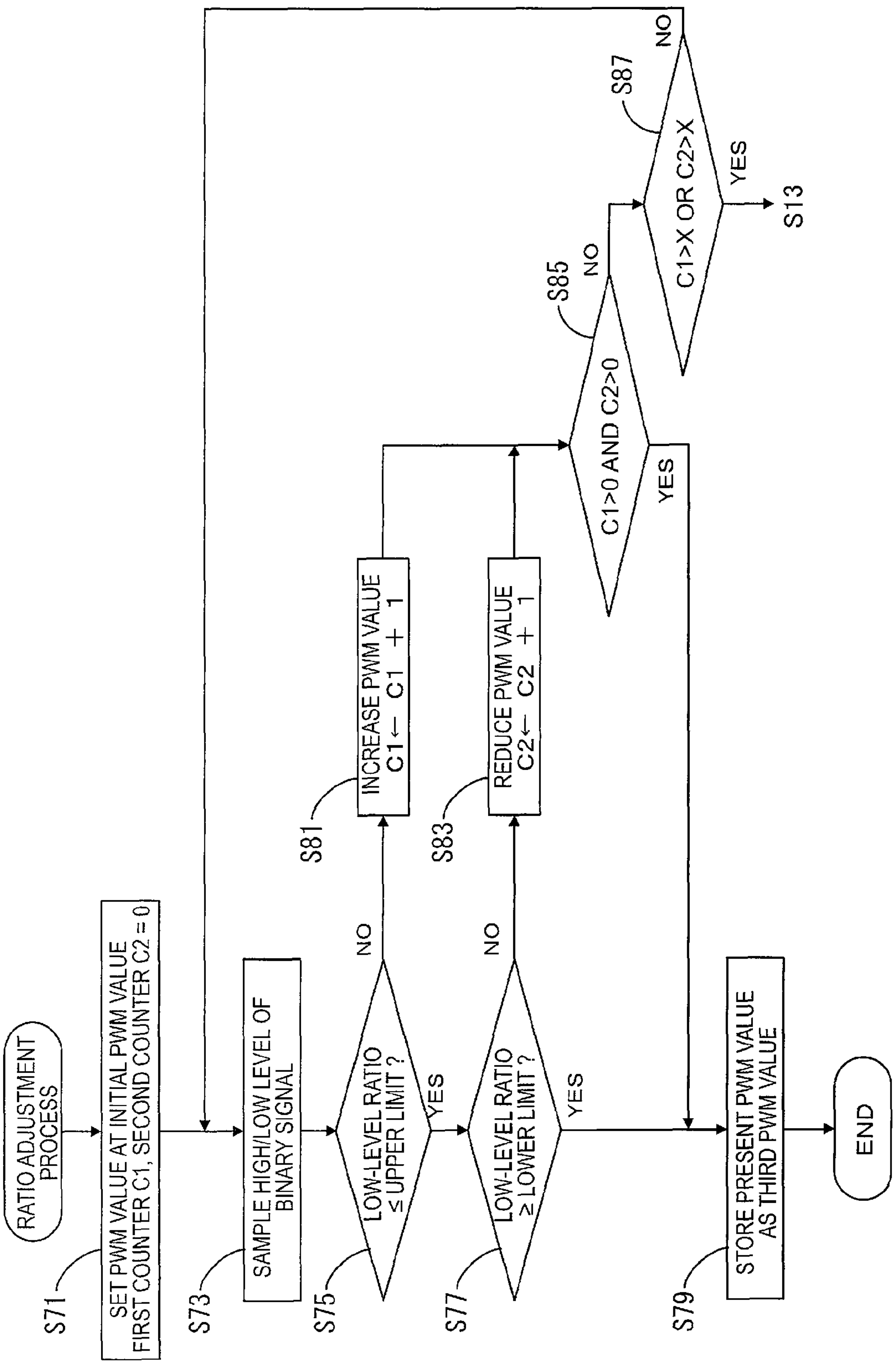
FIG. 9 is a flowchart illustrating a ratio adjustment process.

The sensor-sensitivity adjustment process is executed by the CPU 40 as illustrated in FIG. 7 through 9. With this process, the quantity of light emitted from the light emitting circuit 15A is adjusted so that the difference between the average level VA of the belt-reflection light reception signal S1 and the second level V3 is reduced. Note that the sensor-sensitivity adjustment process is executed when a predetermined condition is met, e.g. right after the printer 1 is powered on, right before the above-described color-deviation correction process is executed, etc. Note also that, at the start of the sensor-sensitivity adjustment process, the drive mechanism 47 is activated under instruction of the CPU 40, and the belt 13 starts to rotate.

First, in S1, the CPU 40 sets the reference level in the comparison circuit 15C at the start level V1 and resets the number of cycles to 0 (zero). Next, in S3, the CPU 40 determines whether the pattern sensor 15 is in the normal condition. Specifically, the CPU 40 determines whether the binary signal S2 is at the low level. At this moment, the CPU 40 has not provided the start instruction to the light emitting circuit 15A yet. Accordingly, if the pattern sensor 15 is in the normal condition, the light emitting element 51 is off, the level of the light reception signal S1 exceeds the start level V1, and the binary signal S2 is at the low level (S3: Yes). Then, the process goes to S5. In S5, the CPU 40 provides the start instruction to the light emitting circuit 15A to activate it and, in S7, executes an initial-value search process.

On the other hand, if the binary signal S2 is at the high level (S3: No), the CPU 40 determines that at least one of the light emitting circuit 15A, the light receiving circuit 15B, etc. is having some trouble. Then, the CPU 40 executes an error handling in S13 and cancels this sensor-sensitivity adjustment process. In the error handling, the CPU 40 displays an error message or turns on a predetermined pattern in the display unit 45, outputs an error signal to the external equipments, etc.

(1) Initial Value Search Process

In this illustrative aspect, while a ratio adjustment process is performed (in S9 in FIG. 7; described below) as the main stage of reducing the difference between the average level VA and the second level V3, the initial-value search process illustrated in FIG. 8 is performed prior to the ratio adjustment process in order to search an initial value of the PWM value (herein referred to as an "initial PWM value"; an illustration of an "initial control value") to start the ratio adjustment process. Specifically, the CPU 40 searches a PWM value wherewith the difference between the average level VA and the second level V3 is as less as possible and determines the PWM value as the initial PWM value. The CPU 40 functions as a "search unit" then.

The CPU 40, first, adds 1 to the number of cycles N and sets the reference level at the first level V2 (S31). Then, the CPU 40 determines whether the binary signal S2 is at the low level (S33). At this moment, though the light emitting circuit 15A has been activated, the quantity of light emitted therefrom is very small. Accordingly, if the pattern sensor 15 is in the normal condition, the level of the light reception signal S1 is higher than the first level V2, the binary signal S2 is at the low level (S33: Yes), and the process goes to S35. On the other hand, if the binary signal S2 is at the high level (S33: No), the CPU 40 determines that the pattern sensor 15 is having some trouble, and the process goes to S13 in FIG. 7 so that the CPU 40 executes the error handling.

In S35, the CPU 40 increases the PWM value by a value for a predetermined unit quantity to increase the quantity of light emitted from the light emitting circuit 15A, thereby changing the light reception signal S1 closer to the first level V2. In S37, the CPU 40 determines whether the present PWM value is equal to or smaller than a max value. If the present PWM value exceeds the max value (S37: No), the process goes to S13 in FIG. 7. On the other hand, if the present PWM value is equal to or smaller than the max value (S37: Yes), the process goes to S39.

In S39, the CPU 40 determines whether the light reception signal S1 is at the level equal to or lower than the first level V2. Specifically, the CPU 40 determines whether the binary signal S2 is at the high level. If the binary signal S2 is at the low level (S39: No), the process returns to S35. If the binary signal S2 is at the high level (S39: Yes), the CPU 40 determines that the light reception signal S1 is at the level equal to or lower than the first level V2, and the process goes to S41. In S41, the CPU 40 stores the PWM value at that moment (at the time when the binary signal S2 is determined to be at the high level in S39) as a first PWM value D1 in, for example, the NVRAM 43. Then, in S43, the CPU 40 changes the reference level to the second level V3. Then, the process goes to S45.

In S45, the CPU 40 determines whether the binary signal S2 is at the low level. Note that it is the time moment right after the reference level is changed to the second level V3. Accordingly, if the pattern sensor 15 is in the normal condition, the light reception signal S1 exceeds the second level V3, and the binary signal S2 is at the low level (S45: Yes). Then, the process goes to S47. On the other hand, if the binary signal S2 is at the high level (S45: No), the CPU 40 determines that the pattern sensor 15 is having some trouble. Then, the process goes to S13 in FIG. 7 so that the CPU 40 executes the error handling.

In S47, the CPU 40 increases the PWM value by a value for a predetermined unit quantity to increase the quantity of light emitted from the light emitting circuit 15A and thereby changes the light reception signal S1 closer to the second level V3. In S49, the CPU 40 determines whether the present PWM value is equal to or smaller than the max value. If the present PWM value exceeds the max value (S49: No), the process goes to S13 in FIG. 7. On the other hand, if the present PWM value is equal to or smaller than the max value (S49: Yes), the process goes to S51.

In S51, the CPU 40 determines whether the light reception signal S1 is at the level equal to or lower than the second level V3. Specifically, the CPU 40 determines whether the binary signal S2 is at the high level. If the binary signal S2 is at the low level (S51: No), the process returns to S47. If the binary signal S2 is at the high level (S51: Yes), the CPU determines that the light reception signal S1 is at the level equal to or lower than the second level V3, and the process goes to S53. In S53, the CPU 40 stores the PWM value at that moment (at the moment when the binary signal S2 is determined to be at the high level in S51) as a second PWM value D2 in, for example, the NVRAM 43. Then, the process goes to S55.

In S55, the CPU 40 determines whether the number of cycles N has reached a predetermined number Z (Z=3 in this illustrative aspect). If N is smaller than Z (S55: No), the process returns to S31. If N has reached Z (S55: Yes), the process goes to S57. In S57, the CPU 40 calculates an average value D1A of the first PWM values D1 of X cycles and an average value D2A of the second PWM values D2 of X cycles; then, the CPU 40 stores the average values D1A, D2A in, for example, the NVRAM 43. Then, the CPU 40 terminates the initial-value search process. Note that the average value D2A is used as the initial PWM value for the ratio adjustment process, while the average value D1A is used in a saturation level shift process (S11 in FIG. 7; described below).

Note that, where the quantity of light emitted from the light emitting circuit 15A is greater (e.g. where the light reception signal S1 is closer to the second level V3), the linearity between the PWM value and the quantity of the emitted light is lost, i.e. the variation in the quantity of the emitted light produced with a same PWM value is comparatively great. To the contrary, where the quantity of light emitted from the light emitting circuit 15A is less (e.g. where the light reception signal S1 is closer to the first level V2), the variation in the quantity of the emitted light is comparatively small. Accordingly, in S57, the CPU 40 may store the first PWM value D1 of the first cycle instead of the average value D1A and use the first PWM value D1 of the first cycle in the saturation level shift process.

In short, in this initial-value search process, the CPU 40 switches the reference level alternately to the first level V2 and to the second level V3, while obtaining the PWM values (the second PWM values D2) of the moment when the light reception signal S1 has downwardly crossed the second level V3, calculates the average value D2A of the second PWM values D2 of Z cycles, and, on the basis of the average value D2A, determines the initial PWM value for the ratio adjustment process. An effect of this configuration is as follows.

While the ratio adjustment process (described below) is performed with the reference level set at the second level V3, the belt-reflection light reception signal S1 fluctuates as described above. Therefore, supposing that the ratio adjustment process is started with a PWM value at the single time point (the second PWM value D2 of, for example, the first cycle) set as the initial PWM value, the difference between the average level of the light reception signal S1 produced with the initial PWM value and the second level V3 is different in each operation of the ratio adjustment process. As a result of this, the time required for the ratio adjustment process can be sometimes so longer that the user has to wait for a long time then.

Differently from this, in this illustrative aspect in accordance with the present invention, the CPU 40 executes the above-described initial-value search process to calculate the average value D2A of the second PWM values D2 and sets the average value D2A as the initial PWM value. Thus, the time required for the ratio adjustment process can be constantly shorter, and the ratio-adjustment process can be smoothly operated in every operation.

(2) Ratio Adjustment Process

The ratio adjustment process will now be described with reference to FIG. 9 and FIG. 10. Note that the axes and the lines that represent the respective ones identical with those of FIG. 5 and FIG. 6 are designated with the identical reference characters, while the description will be omitted.

First, in S71, the CPU 40 sets the PWM value for controlling the quantity of light emitted from the light emitting circuit 15A as the initial PWM value. Then, the CPU 40 resets a first counter C1 and a second counter C2 to 0 (zero). Next, in S73, the CPU 40 periodically samples the binary signal S2 (obtains the binary signal S1 a plurality of times at intervals) as illustrated in FIG. 10. Note that the user can change the sampling period (e.g. 10 [ms] or 5 [ms]) and the number of the sampling points (e.g. 100 points or 200 points) by operating the operation unit 46. In addition, in order to still more suitably reduce the influence of the variation in the reflectance over the entire circumferential length of the belt 13, the sampling should be performed while the belt 13 is circulating one round or more.

Figure 10:
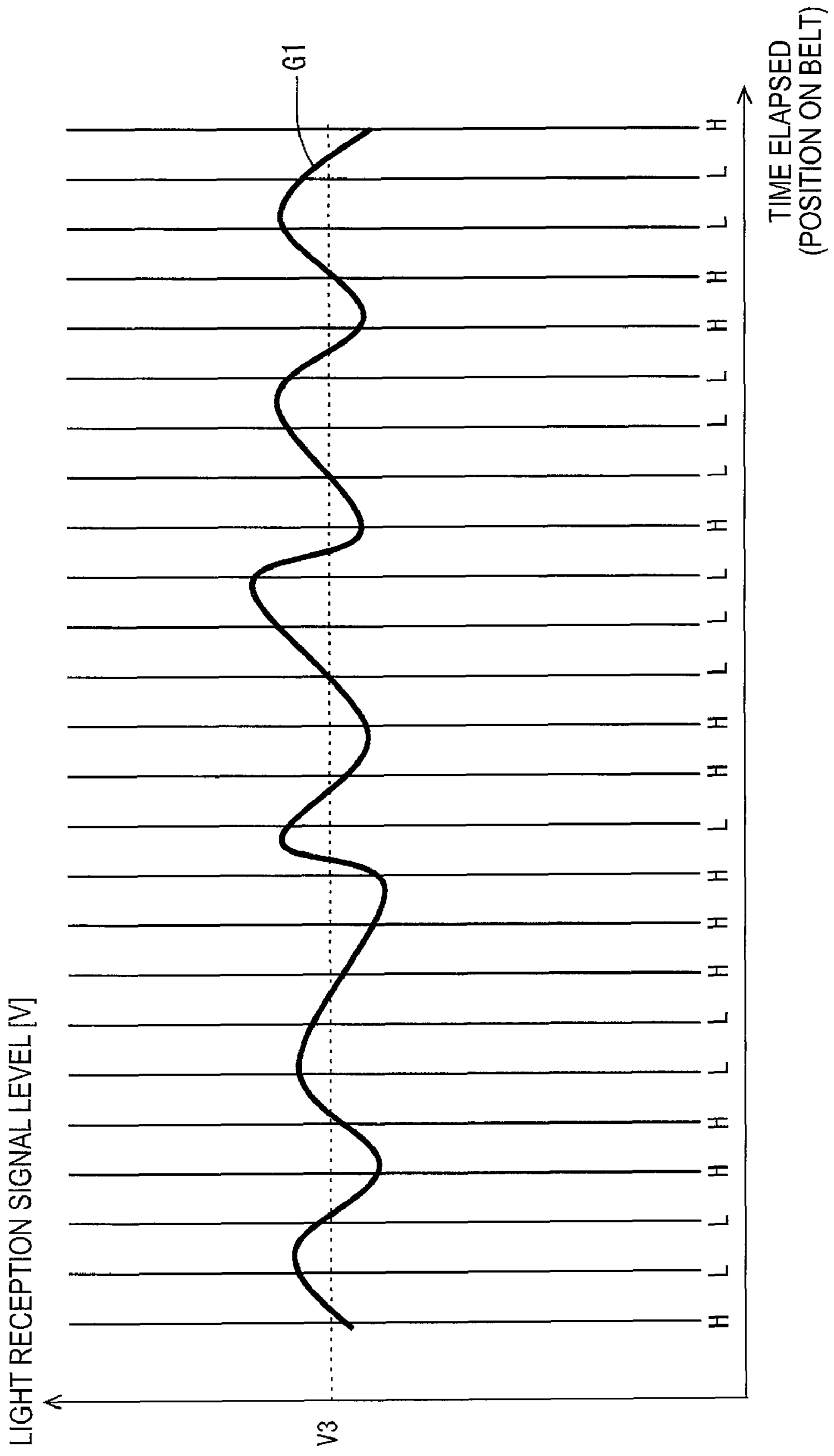
FIG. 10 is a graph illustrating a result of comparison between a belt-reflection light reception signal and a second level.

Note that the character "H" at the sampling points in FIG. 10 indicates that the binary signal S2 is at the high level at the sampling points, while "L" indicates that the binary signal S2 is at the low level. They are hereinafter referred to as "high-level points" and "low-level points". On a basis of the number of the high-level points and the number of the low-level points, the CPU 40 evaluates the degree of closeness between the average level VA and the second level V3 (S75 and S77 in FIG. 9). The CPU 40 functions as an "evaluator" then.

Specifically, it is conceivable that the degree of closeness is higher as a low-level ratio (the ratio of the number of the low-level points to the total number of the sampling points) (an illustration of a "first ratio") approaches 50%. Accordingly, in this illustrative aspect, the CPU 40 judges in S75 and in S77 whether the low-level ratio is within a reference range (e.g. from 40% to 60%). If the low-level ratio is within the reference range (S75: Yes and S77: Yes), the CPU 40 determines that the difference between the average level VA and the second level V3 has been reduced to the extent that the difference does not affect the mark determination accuracy. Then, the CPU 40 stores the present PWM value as a third PWM value D3 in, for example, the NVRAM 43 and then terminates the ratio adjustment process.

On the other hand, if the low-level ratio is out of the reference range, the CPU changes the present PWM value so that the low-level ratio approaches the reference range, i.e. so that the average level VA approaches the second level V3. Specifically, if the low-level ratio exceeds an upper limit of the reference range (S75: No), the CPU 40 increases the present PWM value by a value for a predetermined unit quantity and adds 1 to the first counter C1 (S81); then, the process goes to S85. If the low-level ratio is lower than a lower limit of the reference range (S77: No), the CPU 40 reduces the present PWM value by a value for the predetermined unit quantity in S83 and adds 1 to the second counter C2 (S83); then, the process goes to S85.

In S85, the CPU 40 determines whether the magnitude relation between the low-level ratio and a high-level ratio (an illustration of a "second ratio") has been reversed during the ratio adjustment process. Specifically, the CPU 40 determines whether both of the value of the first counter C1 and the value of the second counter C2 are other than 0 (zero). Note that both of the values are other than 0 (zero) when, for example, the process is proceeded in a manner as follows: the low-level ratio exceeds the upper limit (S75: No); the CPU 40 increases the PWM value (S81); and then this causes the low-level ratio to be reduced across the reference range to a ratio lower than the lower limit (S77: No). In this case (S85: Yes), reversal of the magnitude relation will be repeated for an indefinite further time period while the low-level ratio is out of the reference range. Therefore, in order to avoid such reversal of the magnitude relation, the process goes to S79. In S79, the CPU 40 stores the PWM value at that moment as the third PWM value D3. On the other hand, if the magnitude relation has not been reversed (S85: No), the process goes to S87.

In S87, the CPU 40 determines whether at least one of the value of the first counter C1 (the number of cycles where the low-level ratio exceeds the upper limit (S75: No)) and the value of the second counter C2 (the number of cycles where the low-level ratio is less than the lower limit (S77: No)) exceeds a predetermined number X (e.g. X=7). If each of the value of the first counter C1 and the value of the second counter C2 is equal to or less than the predetermined number X (S87: No), the process returns to S73 so that the CPU 40 repeats the sampling of the binary signal S2. The CPU 40 functions as a "controller" then.

On the other hand, if at least one of the value of the first counter C1 and the value of the second counter C2 exceeds the predetermined number X (S87: No), the CPU 40 judges that the possibility of success in limiting the low-level ratio within the reference range is few. Then, the process goes to S13 in FIG. 7 so that the CPU 40 executes the error handling and cancels the sensor-sensitivity adjustment process. Note that the user can change the reference range by operating the operation unit 46.

(3) Saturation Level Shift Process

By determining the third PWM value D3 as the PWM value for producing the quantity of light emitted from the light emitting circuit 15A at the second level V3 as described above, the difference between the average level VA and the second level V3 can be limited within the predetermined range. Note here that the level where the influence of the noise content in the light reception signal S1 can be less is a saturation level V4 (substantially 0 (zero) [V]) (the level where the light receiving circuit 15B is saturated). Accordingly, the average level VA should be ultimately shifted to the saturation level V4.

Therefore, in this illustrative aspect, the saturation level shift process to shift the average level VA to the saturation level V4 is performed in S11 in FIG. 7. Specifically, the CPU 40 calculates a final PWM value DF so that the average level VA has the difference from the saturation level V4 substantially equal to the difference from the second level V3 after the ratio adjustment process. More specifically, the CPU 40 calculates the final PWM value VF by substituting the average value D1A of the first PWM values D1, the third PWM value D3, the first level V2, the second level V3, and the saturation level V4 to a formula as follows: $DF = D3 + (V4 - V3) \times \{(D3 - D1A)/(V3 - V1)\}$ Then, the CPU 40 sets the present PWM value at the final PWM value DF. Thus, the average level VA can be shifted closer to the saturation level V4 to the extent that the difference therebetween does not cause specific trouble in determination of the marks 50 etc. Note that, as described above, the average level VA is adjusted not directly to the saturation level V4 but is adjusted first to the second level V3, which is higher than the saturation level V4, by execution of the ratio adjustment process and, thereafter, is shifted to the saturation level V4. This is because execution of the ratio adjustment process is difficult to perform at the saturation level V4.

(Effects of Illustrative Aspect)

(1) With this illustrative aspect, the light reception signal S1 is obtained a plurality of times (or at the plurality of sampling points) under a sensor sensitivity. The light reception signal S1 can be at different levels at the plurality of sampling points due to the various factors. Therefore, the CPU 40 judges whether the ratio of the low-level points (where the light reception signal S1 is at the level equal to or higher than the target level) to the plurality of sampling points is within the reference range. Thus, the degree of closeness between the average level VA of the light reception signal S1 at the plurality of sampling points and the second level V3 can be evaluated. Then, when the evaluation result is an undesired one, i.e. when the ratio of the low-level points is out of the reference range, the sensor sensitivity is changed, and the ratio adjustment process is repeated. Thus, the influence of the variation in the light reception signal S1 can be reduced, and the degree of closeness is increased, i.e. the sensor sensitivity of the pattern sensor 15 can be suitably adjusted. Furthermore, with this, the accuracy in determination of the mark 50 and, by extension, in the color-deviation correction process can be maintained.

Note that the CPU 40 illustrated in this illustrative aspect is configured to receive not the light reception signal S1 but the binary signal S2. Accordingly, while the CPU 40 can grasp the magnitude relation between the light reception signal S1 and the reference levels, the CPU 40 cannot grasp the detailed level (or magnitude) of the light reception signal S1 itself. The above-described manner of evaluating the degree of closeness between the average level VA and the reference level (the target level etc.) by the ratio adjustment process based on the low-level ratio is useful particularly for such a configuration.

(2) Furthermore, the sensor-sensitivity adjustment process is executed while the belt 13 is circulating. Therefore, the light reception signal S1 corresponding to the variation in the reflectance of the surface of the belt 13 can be efficiently obtained. In addition, the time period from start of circulation of the belt 13 under the image forming instruction to the moment when the sheet 3 is sent onto the belt 13 can be efficiently utilized to perform the process of obtaining the light reception signal S1.

<Other Illustrative Aspects>

The present invention is not limited to the illustrative aspect described above with reference to the drawings; the following illustrative aspects are also included within the scope of the present invention.

(1) In the above-described illustrative aspect, the position corresponding to a center time point of two time points where the level of the light reception signal S1 crosses the mark determination threshold VH is determined as the position of each mark 50. The "determiner" of the present invention is not limited to this. The position to be determined as the position of each mark 50 may be a position corresponding to an intermediate time point other than the center time point. Furthermore, a position corresponding to a time point where a signal wave of the light reception signal S1 has reached a peak may be determined as the position of each mark. With this configuration, a difference in the waveform of the signal wave should be determined on a basis of a crest of the signal wave. Furthermore, the determination may be made only on presence or absence of the marks 50.

(2) In the above illustrative aspect, the changer changes the sensor sensitivity of the pattern sensor 15 by changing the quantity of light emitted from the light emitting circuit 15A. The "changer" of the present invention is not limited to this. The changer may change a sensitivity of the light receiving circuit 15B (the efficiency of conversion from the quantity of received light to the level of the light reception signal S1). For example, the amplification degree of the OP-amp 55 of the light receiving circuit 15B may be changed, or, the resistance value of the resistor 54 (in FIG. 3) may be changeable so that the photoelectric conversion efficiency of the light receiving element 52 is changed.

(3) In the above-illustrative aspect, the evaluator evaluates the degree of closeness between the average level of the light reception signal S1 and the target level depending on the magnitude relation between the light reception signal S1 and the target level. The "evaluator" of the present invention is not limited to this. For example, the evaluator may evaluate the degree of closeness between the average level of the light reception signal S1 and the target level depending on a magnitude relation between the light reception signal S1 and a predetermined range of the target level. In this case, the magnitude relation should be obtained by comparing the average level of the light reception signal S1 and an upper limit (and, further, a lower limit) of the predetermined range.

(4) In the above-described illustrative aspect, the evaluator judges whether the first ratio (the low-level ratio) is within the reference range. The "evaluator" of the present invention is not limited to this. For example, the evaluator may judge whether the second ratio (the high-level ratio) is out of the reference range. Furthermore, the evaluator may judge whether a difference between the first ratio and the second ratio is within the reference range. Furthermore, not limited to the ratio, the evaluator may perform the evaluation on a basis of whether the ratio meeting a condition that the light reception signal received within a predetermined time is at a target level or equal to or lower or equal to or higher than the target level is within the reference range.

Furthermore, the control value (the PWM value for the light emission control etc.) for the sensor sensitivity may be changed according to the result of the calculation of the first ratio or the second ratio so that the difference between the average level VA and the target level is within a predetermined range. Specifically, information concerning a relationship between the first ratio (or the second ratio) and a correction amount is obtained by experiments etc. and is stored in a memory such as the NVRAM 43 etc.; then, the correction amount which corresponds to the result of calculation of the first ratio (or the second ratio) is read out from the memory and is used to correct the control value so that the difference between the average value of the light reception signal S1 and the target level is within the predetermined range.

Furthermore, in a case where the CPU 40 is configured to receive the signal wave of the light reception signal S1 as it is and perform A/D conversion of the signal wave, the CPU 40 may calculate the average level of the light reception signal obtained a plurality of times and evaluate the degree of closeness on a basis of a difference between a result of the calculation and the target level.

(5) In the above-described illustrative aspect, the average value of the PWM value of a plurality of cycles is set as the initial PWM value. The present invention is not limited to this. For example, an intermediate value of the plurality of PWM values, an central value between a max PWM value and a minimum PWM value, etc. may be set as the initial PWM value.

(6) In the above-described illustrative aspect, the pattern sensor 15 outputs the binary signal S2. The present invention is not limited to this. The CPU 40 may obtain the signal wave of the light reception signal S1 as it is, perform A/D conversion of the light reception signal S1, and compare the digital wave with the reference level.

(7) In the correction process of the above-described illustrative aspect, the color-deviation correction process for correcting the deviation in the forming position of the different color images in the vertical scanning direction is performed. The present invention is not limited to this. For example, the correction process may be a process for correcting deviation in the image forming position in the main scanning direction or correction of deviation in the interval between the forming positions between image lines that configure a same color image. That is, it is only necessary for the correction process to be a process for correcting the image forming position on a basis of a result of mark determination.

In the above-described illustrative aspect, the color printer performing LED exposure is illustratively described. The "image forming apparatus"of the present invention is not limited to this. The image forming apparatus may be a printer that forms only a monochromatic image (a monochromatic printer), an electrophotographic printer of another type that utilizes another light emitting element, laser light source, etc., an inkjet printer, etc.

(9) The image forming apparatus illustrated in the above-described illustrative aspect is a direct tandem type printer that forms the marks on the belt 13 for conveying the sheet 3 and determine the mark position. The "object" and the "carrier" of the present invention are not limited to this. For example, the image forming apparatus may be a printer of an intermediate transfer type that forms the marks on an intermediate transfer belt using a forming unit. Furthermore, the present invention may be adopted to an image forming apparatus that includes the pattern sensor 15 having a shutter in front thereof and adjusts the quantity of light emitted from the light emitting circuit 15A with the shutter closed. Specifically, light is emitted from the light emitting circuit 15A toward an inner surface of the closed shutter and, while receiving the reflection light at the light receiving circuit 15B, the above-described sensor-sensitivity adjustment process is executed. Because the shutter is configured to be opened and closed, the position varies according to open/close of the shutter. As a result of this, the light reception signal varies. Therefore, the present invention is useful for the configuration. In this case, the shutter is the "object".

What is claimed is

1. An image forming apparatus comprising:

a carrier;

a forming device configured to form a mark on the carrier;

a sensor including a light emitting device and a light receiving device, the light emitting device being configured to emit light toward the carrier, and the light receiving device being configured to receive light reflected from at least one of the carrier and the mark and output a light reception signal corresponding to a quantity of the received light;

a determiner configured to determine a position of the mark on a basis of the light reception signal;

a changer configured to change a sensor sensitivity of the sensor by changing at least one of a quantity of light emitted by the light emitting device and a sensitivity of the light receiving device;

an evaluator configured to obtain the light reception signal a plurality of times and configured to evaluate a degree of closeness between an average level of the light reception signal obtained a plurality of times and a target level; and a controller configured to control the changer to change the sensor sensitivity of the sensor according to a result of the evaluation of the evaluator, wherein a first ratio is a ratio of a number to the plurality of times, the number being a number of times where either one of a plurality of conditions is met, the plurality of conditions including a condition where the light reception signal is at the target level, a condition where the light reception signal is equal to or lower than the target level, and a condition where the light reception signal is equal to or higher than the target level, and wherein the evaluator evaluates the degree of closeness on a basis of a judgment whether the first ratio is within a reference range.

2. The image forming apparatus according to claim 1, wherein:

upon judgment of the evaluator that the first ratio is out of the reference range, the controller controls the changer to change the sensor sensitivity of the sensor; and the evaluator evaluates the degree of closeness again after the controller changes the sensor sensitivity of the sensor.

3. The image forming apparatus according to claim 1, wherein:

a second ratio is a ratio of a number to the plurality of times, the number being a number of times where none of a plurality of conditions is met; and upon judgment of the evaluator that the first ratio is out of the reference range, and upon reversal of a magnitude relation between the first ratio and a second ratio, the controller terminates the change of the sensor sensitivity based on the first ratio.

4. The image forming apparatus according to claim 1, further comprising searching unit configured to execute an initial-value search process, the initial-value search process including: grasping a control value for the sensor sensitivity in the changer a plurality of cycles when the light reception signal meets the condition and, on a basis of the control value grasped in the plurality of cycles, searching an initial control value, wherein the evaluator starts the evaluation of the degree of closeness at the initial control value.

5. The image forming apparatus according to claim 4, wherein:

in the initial-value search process, the searching unit grasps the control value for the sensor sensitivity either one of when the light reception signal has become equal to or lower than a predetermined level and when the light reception signal has become equal to or higher than the predetermined level, the predetermined level being lower than the target level; and upon judgment of the evaluator that the first ratio is within the reference range, the controller controls the changer to change the control value at the time of the judgment on a basis of the target level, the initial control value, the predetermined level, and the control value corresponding to the predetermined level and to shift the average level toward a saturation level of the light receiving device.

6. The image forming apparatus according to claim 1 further comprising:

a belt as the carrier and the object; and a drive mechanism configured to rotate the belt, wherein the evaluator obtains the light reception signal the plurality of times during rotation of the belt.

7. An image forming apparatus comprising:

a carrier;

an object different from the carrier;

a forming device configured to form a mark on the carrier;

a sensor including a light emitting device and a light receiving device, the light emitting device being configured to emit light toward at least one of the carrier and the object, and the light receiving device being configured to receive light reflected from at least one of the carrier and the object and output a light reception signal corresponding to a quantity of the received light;

a determiner configured to determine a position of the mark on a basis of the light reception signal at a time when the light emitting device emits light to the carrier;

a changer configured to change a sensor sensitivity of the sensor by changing at least one of a quantity of light emitted by the light emitting device and a sensitivity of the light receiving device;

an evaluator configured to obtain the light reception signal at a time when the light emitting device emits light to the object a plurality of times and configured to evaluate a degree of closeness between an average level of the light reception signal obtained a plurality of times and a target level; and a controller configured to control the changer to change the sensor sensitivity of the sensor according to a result of the evaluation of the evaluator, wherein a first ratio is a ratio of a number to the plurality of times, the number being a number of times where either one of a plurality of conditions is met, the plurality of conditions including a condition where the light reception signal is at the target level, a condition where the light reception signal is equal to or lower than the target level, and a condition where the light reception signal is equal to or higher than the target level, and wherein the evaluator evaluates the degree of closeness on a basis of a judgment whether the first ratio is within a reference range.

8. An image forming apparatus comprising:

a carrier;

a forming device configured to form a mark on the carrier;

a sensor including a light emitting device and a light receiving device, the light emitting device being configured to emit light toward the carrier, and the light receiving device being configured to receive light reflected from at least one of the carrier and the mark and output a light reception signal corresponding to a quantity of the received light;

a changer configured to change a sensor sensitivity of the sensor by changing at least one of a quantity of light emitted by the light emitting device and a sensitivity of the light receiving device;

a processing unit; and memory storing machine readable instructions that, when executed by the processing unit, cause the processing unit to function as a determiner configured to determine a position of the mark on a basis of the light reception signal;

an evaluator configured to obtain the light reception signal a plurality of times and configured to evaluate a degree of closeness between an average level of the light reception signal obtained a plurality of times and a target level; and a controller configured to control the changer to change the sensor sensitivity of the sensor according to a result of the evaluation of the evaluator, wherein a first ratio is a ratio of a number to the plurality of times, the number being a number of times where either one of a plurality of conditions is met, the plurality of conditions including a condition where the light reception signal is at the target level, a condition where the light reception signal is equal to or lower than the target level, and a condition where the light reception signal is equal to or higher than the target level, and wherein the evaluator evaluates the degree of closeness on a basis of a judgment whether the first ratio is within a reference range.

9. The image forming apparatus according to claim 8, wherein:

upon judgment of the evaluator that the first ratio is out of the reference range, the controller controls the changer to change the sensor sensitivity of the sensor; and the evaluator evaluates the degree of closeness again after the controller changes the sensor sensitivity of the sensor.

10. The image forming apparatus according to claim 8, wherein:

a second ratio is a ratio of a number to the plurality of times, the number being a number of times where none of a plurality of conditions is met; and upon judgment of the evaluator that the first ratio is out of the reference range, and upon reversal of a magnitude relation between the first ratio and a second ratio, the controller terminates the change of the sensor sensitivity based on the first ratio.

11. The image forming apparatus according to claim 8, wherein the memory further stores machine readable instructions that, when executed by the processing unit, cause the processing unit to function as a searching unit configured to execute an initial-value search process, the initial-value search process including: grasping a control value for the sensor sensitivity in the changer a plurality of cycles when the light reception signal meets the condition and, on a basis of the control value grasped in the plurality of cycles, searching an initial control value, and wherein the evaluator starts the evaluation of the degree of closeness at the initial control value.

12. The image forming apparatus according to claim 11, wherein:

in the initial-value search process, the searching unit grasps the control value for the sensor sensitivity either one of when the light reception signal has become equal to or lower than a predetermined level and when the light reception signal has become equal to or higher than the predetermined level, the predetermined level being lower than the target level; and upon judgment of the evaluator that the first ratio is within the reference range, the controller controls the changer to change the control value at the time of the judgment on a basis of the target level, the initial control value, the predetermined level, and the control value corresponding to the predetermined level and to shift the average level toward a saturation level of the light receiving device.

13. The image forming apparatus according to claim 8, further comprising:

a belt as the carrier and the object; and a drive mechanism configured to rotate the belt, wherein the evaluator obtains the light reception signal the plurality of times during rotation of the belt.

14. An image forming apparatus comprising:

a carrier;

an object different from the carrier;

a forming device configured to form a mark on the carrier;

a sensor including a light emitting device and a light receiving device, the light emitting device being configured to emit light toward at least one of the carrier and the object, and the light receiving device being configured to receive light reflected from at least one of the carrier and the object and output a light reception signal corresponding to a quantity of the received light;

a changer configured to change a sensor sensitivity of the sensor by changing at least one of a quantity of light emitted by the light emitting device and a sensitivity of the light receiving device;

a processing unit; and memory storing machine readable instructions that, when executed by the processing unit, cause the processing unit to function as a determiner configured to determine a position of the mark on a basis of the light reception signal at a time when the light emitting device emits light to the carrier;

an evaluator configured to obtain the light reception signal at a time when the light emitting device emits light to the object a plurality of times and configured to evaluate a degree of closeness between an average level of the light reception signal obtained a plurality of times and a target level; and a controller configured to control the changer to change the sensor sensitivity of the sensor according to a result of the evaluation of the evaluator, wherein a first ratio is a ratio of a number to the plurality of times, the number being a number of times where either one of a plurality of conditions is met, the plurality of conditions including a condition where the light reception signal is at the target level, a condition where the light reception signal is equal to or lower than the target level, and a condition where the light reception signal is equal to or higher than the target level, and wherein the evaluator evaluates the degree of closeness on a basis of a judgment whether the first ratio is within a reference range.

* * * * *